UNITED STATES PATENT OFFICE.

CARL F. HAGEDORN, OF CHICAGO, ILLINOIS, ASSIGNOR TO MINERAL PRODUCTS CORPORATION, OF NEW YORK, N. Y., A CORPORATION OF MAINE.

RECOVERY OF POTASH FROM CALCINED ALUNITE.

1,175,439. Specification of Letters Patent. Patented Mar. 14, 1916.

No Drawing. Application filed June 7, 1915. Serial No. 32,552.

*To all whom it may concern:*

Be it known that I, CARL F. HAGEDORN, a citizen of the United States, residing at No. 4953 Lake Park avenue, Chicago, county of Cook, State of Illinois, have invented certain new and useful Improvements in the Recovery of Potash from Calcined Alunite; and I do hereby declare the following to be a full, clear, and exact description of the invention, such as will enable others skilled in the art to which it appertains to make and use the same.

The present invention relates to the extraction of sulfate of potash from calcined alunite, by means of water.

The leaching of calcined alunite with water for the purpose of removing the soluble sulfate of potash is attended with considerable difficulty, as ordinarily attempted, large quantities of water being required to remove enough of the potash to get a good percentage of extraction and the mixture being hard to filter so that the obtaining of a clear filtrate is practically impossible.

The present invention permits the extraction of the sulfate of potash to advantage with relatively small quantities of water and produces a filtrate which is clear and a filter cake which can be quickly and easily washed.

The alunite, before calcination, is preferably crushed, so that the calcined product is in a finely divided condition. The calcined alunite is then admitted into a pressure tank containing a body of water sufficient in amount to permit of the dissolving out of substantially all of the potash. This pressure tank is preferably equipped with a stirring device of such a character as to keep all of the material in suspension and in motion, and the quantity of water employed is sufficient to give a saturated solution at say 90° C., allowance being made for such additional water as may result from the condensation of steam in those instances where live steam is admitted for the purpose of heating the contents of the pressure tank. The digestion is carried out at a pressure of preferably 50 to 70 pounds per square inch, although this pressure may be varied within wide limits, and may be as low as say 20 pounds per square inch. The necessary pressure may be produced by heating the contents of the pressure tank in any suitable way, as, for instance, by means of a steam jacket applied to the pressure tank, or by live steam admitted through perforated steam pipes or coils located within the pressure tank and supplied from without by a current of steam.

It will usually be found that at the end of say one hour, the water has extracted almost all of the sulfate of potash from the calcined alunite. Particular care should be taken that the amount of water employed shall be sufficient to maintain in solution all of the sulfate of potash which has been extracted, even though the temperature of the solution should subsequently drop to as low as say 90° C. The purpose of this is to provide for a sufficient drop in temperature in the solution to permit it to be filtered without depositing out any part of its potash content in the filter press. To this end, the hot solution may be discharged (either by the pressure existing within the digester or by a suitable pump) from the digester directly into the filter press, or into storage tanks wherein it is kept at the same high temperature by means of steam-coils or the like. Either directly from the digester, as indicated, or from the storage tanks, the solution is passed through a filter press (such as, for instance, the well-known Kelly filter press), the temperature conditions being such that as it issues from the press the filtrate will still have a temperature of say 90° C. or such other like temperature as will hold in solution all of the sulfate of potash originally extracted by the water in the digester. The filtrate thus obtained is clear and can be either cooled to air temperatures (in which case about half of the contained potash crystallizes out) or it can be evaporated directly in the ordinary way. The filter cake, in the filter press, is then washed by passing boiling water through it, which water removes most of the soluble salts left in the cake, and this water can then be used for dissolving more calcined alunite in the digester. The washing of the filter cake may then be finished with a minimum quantity of boiling water which will be stored temporarily in a separate tank and which will be subsequently used as the wash water for a fresh filter cake in a subsequent operation. It has been found practical, in this way, to reduce the ultimate potash content of the filter cakes down to .25%.

It will be noted that a characteristic feature of the improvement is that the only water to be evaporated is the mother liquor from the saturated solution represented by the filtrate. It is also characteristic of the process that the employment of the higher temperature and pressure results in a quicker extraction with a smaller quantity of water,—in fact, with a quantity of water so small as to represent complete saturation at a temperature no far below the boiling point. Furthermore, it is a peculiar attribute of the process that alumina, instead of being fine or colloidal takes on a granular form, which is particularly favorable to filtration. Accordingly, it is found, as hereinbefore noted, that the filtrate is clear, and that the filter cake itself can be easily and quickly washed.

What I claim is:

1. The method of treating calcined alunite containing potash so as to facilitate the subsequent filtration of the potash, which comprises heating, under pressure, a body of water in which the calcined alunite is contained; substantially as described.

2. The method of treating calcined alunite containing potash so as to facilitate the subsequent filtration of the potash, which comprises heating, under pressure, a body of water in which the calcined alunite is maintained in suspension; substantially as described.

3. The method of extracting potash from calcined alunite containing it, which comprises heating, under pressure, a body of water in which the calcined alunite is contained, until substantially all of the potash is brought into solution, and filtering the solution at such a temperature that the filtrate will retain, as it issues from the filter, practically all of the potash originally extracted by the water in the digester; substantially as described.

In testimony whereof I affix my signature.

CARL F. HAGEDORN.